United States Patent
Pavesio et al.

(10) Patent No.: US 10,486,743 B2
(45) Date of Patent: Nov. 26, 2019

(54) AUXILIARY CROSS-MEMBER STRUCTURE FOR SUPPORTING ELEMENTS OF A MOTOR-VEHICLE FRONT SUSPENSION

(71) Applicant: C.R.F. Societa Consortile per Azioni, Orbassano (Turin) (IT)

(72) Inventors: Carlo Pavesio, Orbassano (IT); Silvano Sandri, Orbassano (IT); Michele Maria Tedesco, Orbassano (IT); Roberto Toffetti, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 66 days.

(21) Appl. No.: 15/683,846

(22) Filed: Aug. 23, 2017

(65) Prior Publication Data
US 2018/0072346 A1 Mar. 15, 2018

(30) Foreign Application Priority Data
Sep. 9, 2016 (EP) .................................... 16188037

(51) Int. Cl.
*B62D 21/11* (2006.01)
*B62D 21/09* (2006.01)
*B62D 29/00* (2006.01)

(52) U.S. Cl.
CPC .............. *B62D 21/11* (2013.01); *B62D 21/09* (2013.01); *B62D 29/005* (2013.01)

(58) Field of Classification Search
CPC ........ B62D 21/03; B62D 21/09; B62D 21/11; B62D 29/001; B62D 29/005; B60G 2206/8103
See application file for complete search history.

(56) References Cited

U.S. PATENT DOCUMENTS 1,656,810 A * 1/1928 Arnstein ................. B64C 1/065
52/634
4,732,819 A * 3/1988 Komuro .............. B21C 37/0803
138/156
(Continued)

FOREIGN PATENT DOCUMENTS

DE 102011085383 A1 5/2013
DE 102014204369 A1 9/2015
(Continued)

OTHER PUBLICATIONS

European Search Report dated Mar. 17, 2017, for European Application No. 16188037.2, 5 pages.

*Primary Examiner* — Frank B Vanaman
(74) *Attorney, Agent, or Firm* — RMCK Law Group PLC (57) ABSTRACT

An auxiliary cross-member structure for supporting elements of a motor-vehicle front suspension includes a metal sheet hollow frame in a form of a hollow shell, with two opposite end portions, for connection of two respective oscillating arms of the suspension. The metal sheet hollow frame is defined by a single metal sheet folded on itself and having portions which are overlapped and welded. In a preferred implementation, within the metal sheet hollow frame is provided an additional filling structure at least partially constituted of synthetic material or composite material incorporating reinforcing fibers. At each end of the auxiliary cross-member structure there are two pairs of holes aligned with each other along two vertical axes which are used both for mounting elastic bushings for connection of a respective oscillating arm, and for the engagement of connecting screws for connecting the auxiliary cross-member structure to the motor-vehicle body.

10 Claims, 11 Drawing Sheets

(56) References Cited

U.S. PATENT DOCUMENTS

| | | | | |
|---|---|---|---|---|
| 5,310,211 A | * | 5/1994 | DelBeke | B60G 7/001 280/124.134 |
| 5,562,308 A | * | 10/1996 | Kamei | B60G 3/20 180/377 |
| 5,819,408 A | * | 10/1998 | Catlin | B62D 21/15 29/897.2 |
| 2001/0020774 A1 | * | 9/2001 | Suzuki | B62D 21/11 280/124.1 |
| 2006/0001228 A1 | * | 1/2006 | Yoshimura | B62D 21/11 280/124.109 |
| 2007/0145188 A1 | * | 6/2007 | Specht | B29C 65/00 244/125 |
| 2014/0232143 A1 | | 8/2014 | Renner et al. | |

FOREIGN PATENT DOCUMENTS

| | | |
|---|---|---|
| EP | 0594131 A1 | 4/1994 |
| EP | 0987166 A1 | 3/2000 |
| EP | 1595724 A1 | 11/2005 |

* cited by examiner

AUXILIARY CROSS-MEMBER STRUCTURE FOR SUPPORTING ELEMENTS OF A MOTOR-VEHICLE FRONT SUSPENSION

CROSS REFERENCE TO RELATED APPLICATIONS

This application claims priority to European Patent Application No. 16188037.2 filed on Sep. 9, 2016, the entire disclosure of which is incorporated herein by reference.

FIELD OF THE INVENTION

The present invention relates to an auxiliary cross-member structure for supporting elements of a motor-vehicle front suspension, said auxiliary cross-member structure being intended to be connected to a motor-vehicle body, and having a metal sheet frame in the form of a hollow shell, with two opposite end portions, for connection of two respective oscillating arms of the suspension.

PRIOR ART

Figure 10:
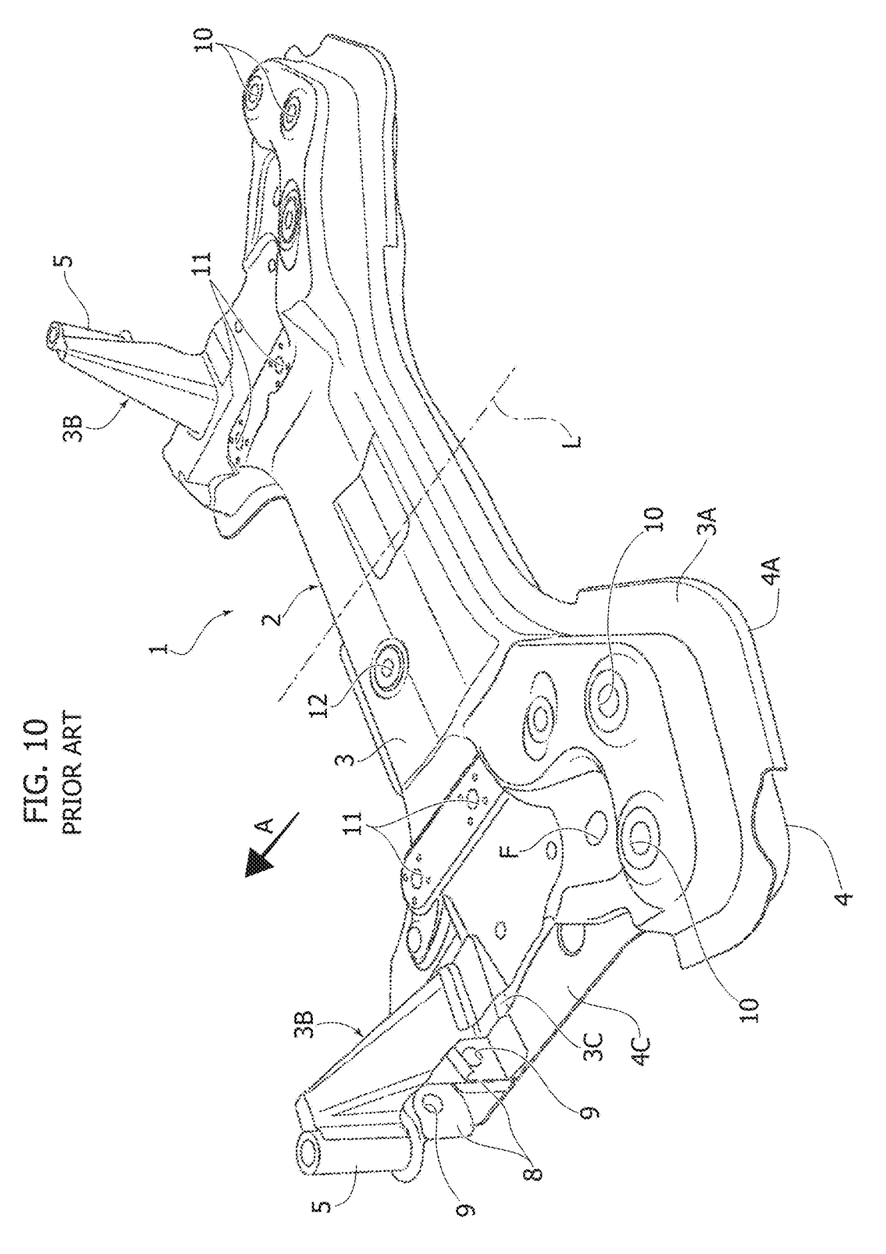
FIGS. 10, 11 are a general perspective view and a partial perspective view of an auxiliary cross-member structure according the prior art, as already described above.
Figure 11:
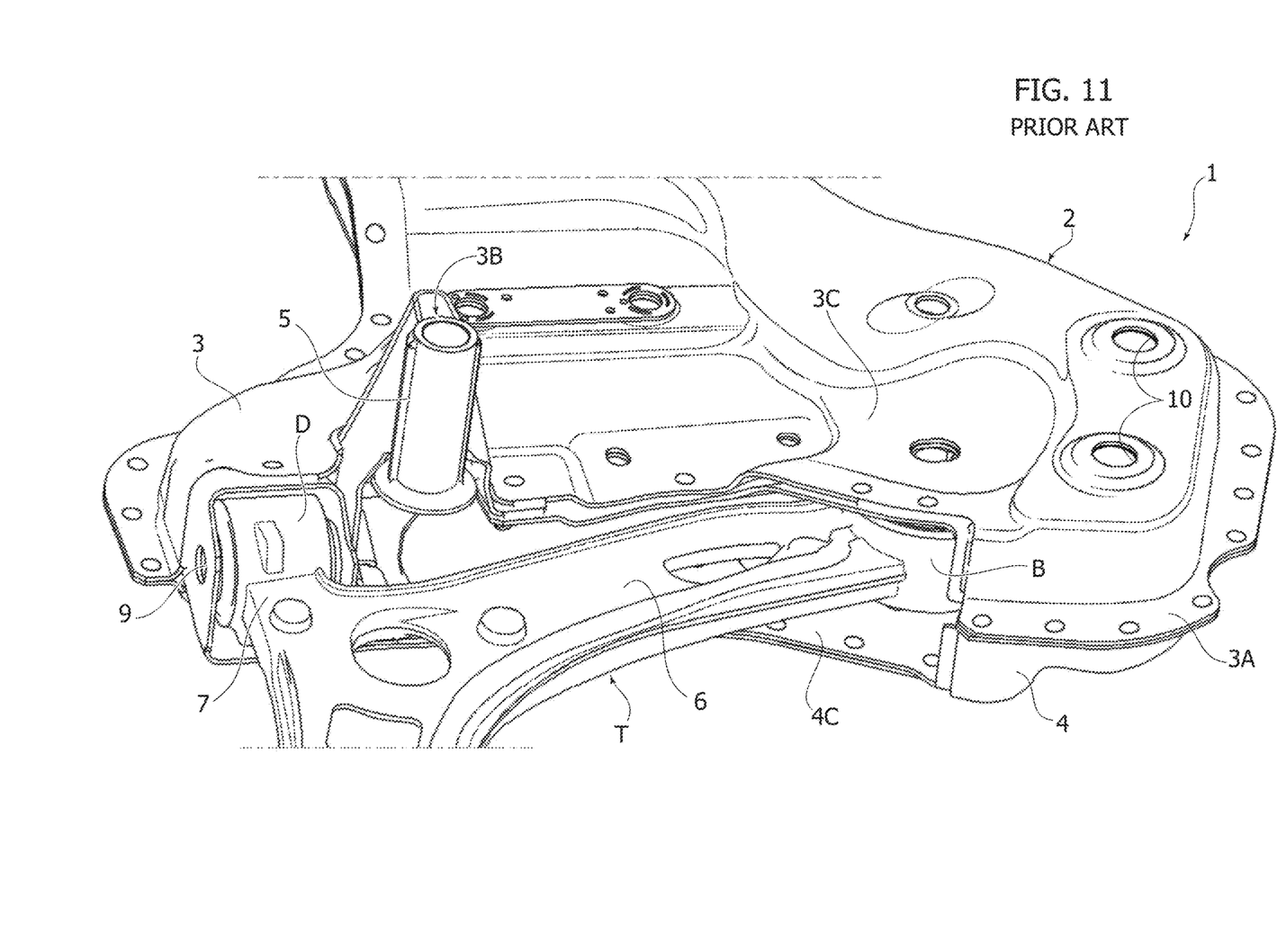

FIGS. 10, 11 of the annexed drawings show a general perspective view and a perspective view of a detail of an auxiliary cross-member structure of the type indicated above which has been used in the past for motor-vehicles produced and commercialized by the FCA group, of which the Applicant is a part.

In FIGS. 10, 11, the auxiliary cross-member structure is generally designated with the reference number 1. The structure 1 comprises a single metal sheet frame in the form of a hollow shell, which is generally indicated by reference 2. The main portion of the frame 2 is constituted by two half-shells of metal sheet 3, 4 which are coupled and welded one to the other. With reference to the mounted condition of the auxiliary structure 1 on the motor-vehicle body, the frame 2 has a cross-member general configuration arranged according to a horizontal general direction which is perpendicular to the longitudinal direction of the motor-vehicle, indicated by line L. Again in FIG. 10, the arrow A indicates the travel direction of the motor-vehicle.

In the present disclosure and in the claims which follow, both with reference to the prior art here described and to the invention, the terms "upper" and "lower", "front" and "rear" are referred to the mounted condition of the auxiliary cross-member structure on the motor-vehicle body.

Returning to the known solution illustrated in FIGS. 10, 11, the upper half-shell 3 and the lower half-shell 4 have coupling flanges 3A, 4A along their front and rear edges and partially also along their ends, said coupling flanges 3A, 4A being rigidly connected to each other, for example by means of electrical spot welding.

An upright 3B is welded adjacent to the front side of the cross-member structure at each end of the upper half-shell 3, said uprights 3B carrying bushings 5 with vertical axes provided for the engagement of connecting screws for connecting the auxiliary cross-member structure 1 to the motor-vehicle body.

Furthermore, at each end of the auxiliary cross-member structure 1, the two half-shells 3, 4 define an upper wall and a lower wall 3C, 4C, welded to, and spaced apart from, each other. Adjacent to the rear side of the cross-member structure, the walls 3C, 4C have a pair of holes F (the drawings show only the upper hole) aligned with each other along a vertical axis for mounting an elastic bushing with a vertical axis (not shown in the drawings) on which a bush-like end portion B is to be mounted (see FIG. 11) of a branch 6 of an oscillating arm T constituting an element of the motor-vehicle front suspension. FIG. 11 shows only a portion of the metal frame of the oscillating arm T. According to the prior art, the external end of the arm T is intended to be pivotally connected to the support of the respective wheel of the motor-vehicle.

Again with reference to FIGS. 10, 11, in the known solution illustrated therein, the oscillating arm T has a second branch 7 which terminates with an end portion D in the form of a horizontal bush, which is supported by an elastic bushing having a horizontal axis (not shown in the drawings) which is mounted between two vertical flanges 8 protruding from the lower wall 4C and having holes 9 aligned with each other along a common horizontal axis which is substantially parallel to the longitudinal direction L.

In the rear portion of the cross-member structure 1, at each end of the cross-member structure 1, the upper half-shell 3 has a pair of holes 10 aligned along two vertical axes with mating holes (not shown in the drawings) provided on the lower half-shell 4. The four pairs of aligned holes so defined are used for the engagement of four connection screws, connecting the cross-member structure 1 to the motor-vehicle body.

Therefore, in the above described known solution, six different connection points of the cross-member structure to the motor-vehicle body are provided, namely located on the two uprights 3B and at four vertical axes along which said holes 10 are aligned.

Again with reference to FIG. 10, also adjacent to its ends, the cross-member structure 1 comprises two respective pairs of holes 11 for the engagement of screws for connecting a control device (not shown) for steering the front wheels of the motor-vehicle, as well as, at an intermediate area, a bushing 12 having a vertical axis, for engagement of a bracket intended to be connected to the structure of the motor-vehicle powertrain unit by means of an articulated rod, so as to counteract the oscillations of the powertrain unit when in operation. Such elements are herein neither described nor illustrated both because they are conventional, and also because they are not critical for understanding the present invention as described in the following.

Technical Problem

In general, cross-member structures of the type indicated above are used for rationalizing and for automating the assembling operations of the motor-vehicle, since the elements of the front suspension can be preassembled on the auxiliary cross-member structure, so that the entire unit formed by the auxiliary cross-member structure with the elements of the suspension carried thereon can be mounted with a single operation under the motor-vehicle body.

In addition to satisfying this need, naturally the auxiliary cross-member structure has to be able to properly transfer to the motor-vehicle body the forces transmitted by the motor-vehicle front wheels to the cross-member structure during the motor-vehicle travel.

Furthermore, the cross-member structure must have adequate strength characteristics, particularly in relation to torsion deformations.

All the above mentioned requirements must be satisfied by providing a structure which results to be simple and inexpensive to manufacture, at the same time.

Object of the Invention

The object of the present invention is to solve all the aforementioned technical problems more efficiently, in comparison to the known solutions.

In particular, it is an object of the invention to provide an auxiliary cross-member structure which results of low-cost and simple construction, with no prejudice for the required strength characteristics.

A further preferred object of the invention is to provide an auxiliary cross-member structure which results to be significantly lighter with respect to a structure of the prior art having identical strength characteristics.

Yet a further preferred object of the invention is to provide an auxiliary cross-member structure by which the operations for connecting the auxiliary cross-member structure to the motor-vehicle body can be simplified.

SUMMARY OF THE INVENTION

In view to achieve one or more of the objects specified above, the present invention has for subject an auxiliary cross-member structure for supporting elements of a motor-vehicle front suspension, said auxiliary cross-member structure being intended to be connected to a motor-vehicle body and having a metal sheet frame in form of a hollow shell with two opposite end portions, for connection of two respective oscillating arms of the suspension.

The auxiliary cross-member structure is characterized in that said hollow frame is defined by a single metal sheet folded on itself, so as to have portions overlapped onto each other and mutually welded.

Preferably, the folding of the metal sheet is performed around folding lines which are all parallel to an ideal folding axis, such as an axis parallel to the longitudinal direction of the cross-member.

Providing the metal frame of the cross-member structure by starting from a single metal sheet simplifies and makes more economical the manufacture of the cross-member structure, mainly because the overlapped portions of the metal sheet can be rigidly connected to each other by means of a number of welding spots significantly lower than the number needed for example in the case of the known solution illustrated in FIGS. 10, 11 of the annexed drawings, in which the metal frame of the cross-member structure is constituted of two separated metal half-shells which are welded to each other both along the front edge and the rear edge of the cross-member, and partially also along the end edges of the cross-member structure.

A further preferred feature of the auxiliary cross-member structure according to the invention is that the auxiliary cross-member structure comprises also an additional filling structure contained within the metal sheet hollow frame and rigidly connected thereto. In the preferred embodiment, the aforementioned additional filling structure is at least partially constituted of synthetic material or composite material incorporating reinforcing fibres. Such a structure can be for example in form of a honeycomb panel, or may have a lattice configuration, or may also be in the form of a panel with a sandwich structure, including panels of plastic material and panels of synthetic material which are stacked on each other. In each of the aforementioned solutions, the synthetic material is preferably a composite material, including a synthetic resin incorporating reinforcement fibres, such as glass fibres, carbon fibres or aramid fibres.

Therefore, in such preferred embodiment the cross-member structure of the invention has a hybrid composition, which is partially metallic and partially constituted of composite material.

According to a further preferred feature of the present invention, each end portion of said hollow frame has an upper wall and a lower wall superimposed upon, and spaced from, each other, and having two pairs of holes aligned with each other along two vertical axes which are mutually spaced along the longitudinal direction of the motor-vehicle, with reference to the mounted condition of said auxiliary cross-member structure on the motor-vehicle body. Said pairs of holes are provided for being used both for mounting two elastic bushings for connection of a respective oscillating arm of the motor-vehicle front suspension, and for the engagement of connecting members for connecting the auxiliary cross-member structure to the motor-vehicle body. Preferably, the two aforementioned pairs of holes having said two vertical axes located at each end of the auxiliary cross-member structure constitute the only connection points of the auxiliary cross-member structure to the motor-vehicle body.

Thanks to the aforementioned features, the auxiliary cross-member structure has only four connection points to the motor-vehicle body. Furthermore, the portions of the auxiliary cross-member structure which identify the four connection points are also used for mounting elastic bushings for the connection of a respective oscillating arm of the suspension, which again considerably simplifies both the cross-member structure and the assembly operations. This result is achieved also due to that the structure is provided for receiving both the elastic bushings for connecting each oscillating arm, which bushings are orientated according a vertical axis, whereby each bushing can be used also for the engagement of a connecting screw of the auxiliary cross-member structure to the motor-vehicle body.

Furthermore, thanks to the aforementioned features, as illustrated in FIGS. 10, 11, the provision of the additional uprights 3B of the known solution is no longer needed, which implies a reduction of the weight of the cross-member structure and a simplification of the operations for manufacturing the cross-member structure and for assembling thereof on the motor-vehicle body.

Finally, in the preferred embodiment which has the additional filling structure within the metal sheet hollow frame of the cross-member structure, the use of composite materials with reinforcement fibres enables the required strength characteristics to be achieved with a total weight of the structure considerably reduced compared to the known solutions.

BRIEF DESCRIPTION OF THE DRAWINGS

Further features and advantages of the invention will become apparent from the following description with reference to the annexed drawings, given purely by way of non limiting example, in which.

DESCRIPTION OF PREFERRED EMBODIMENTS

With reference to FIGS. 1-9, the parts which correspond to those illustrated in FIGS. 10, 11 relating to the prior art are designated by the same reference numbers.

In the preferred embodiment according to the invention, the auxiliary cross-member structure is generally designated by reference number 1 and comprises a metal sheet frame 2 in the form of a hollow shell, which is constituted by a single metal sheet S (illustrated in a planar developed condition in FIG. 7) folded on itself.

Figure 7:
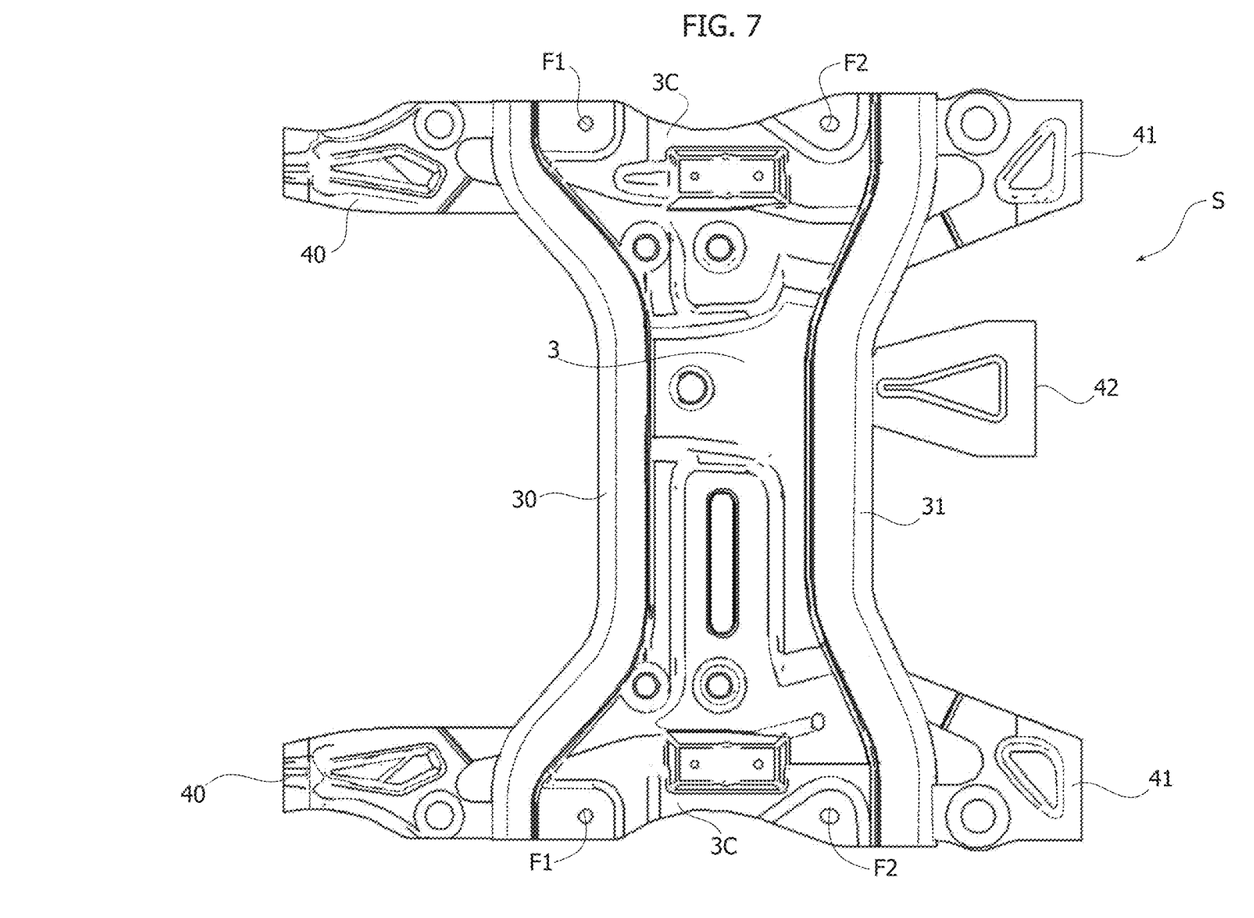
FIG. 7 is a view of the plan layout of the metal sheet which constitutes the blank from which the metal sheet of the auxiliary cross-member structure according to the invention is obtained.
Figure 8:
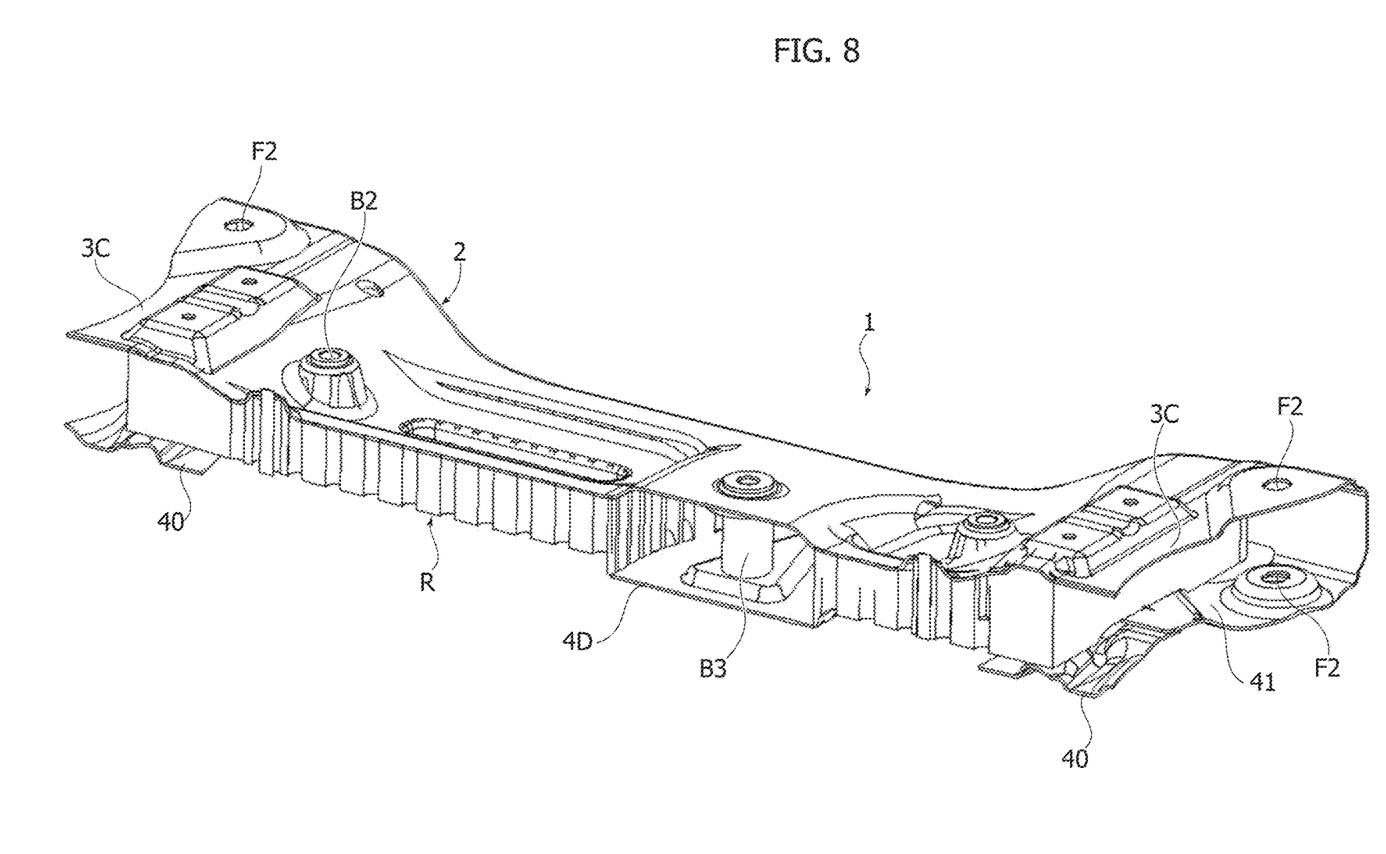
FIG. 8 is a perspective view of the cross-member structure according to the invention, with a cross-section according to a plane perpendicular to the longitudinal direction of the motor-vehicle, with reference to the mounted condition of the cross-member structure on the motor-vehicle body.

The metal sheet S is folded so as to define a metal frame with a substantially flattened and elongated configuration having at each end an upper wall 3C and a lower wall 4C arranged parallel to and spaced from each other.

In the preferred embodiment, the hollow metal frame thereby defined has an upper face 3 which is substantially continuous, whereas on its lower side said metal frame has lower wall portions 4C provided only at the ends of the cross-member and a lower wall portion 4D provided at an intermediate position between the ends of the cross-member structure. In order to define this structure, the metal blank S has an elongated central portion 3 which defines the aforementioned upper main wall of the cross-member metal frame. The central portion 3 comprises two lateral webs 30, 31 (FIG. 7) which, in the final folded condition of the metal sheet S, define a front edge 30 and a rear edge 31 which protrude downwardly from the upper main wall 3.

Figure 6:
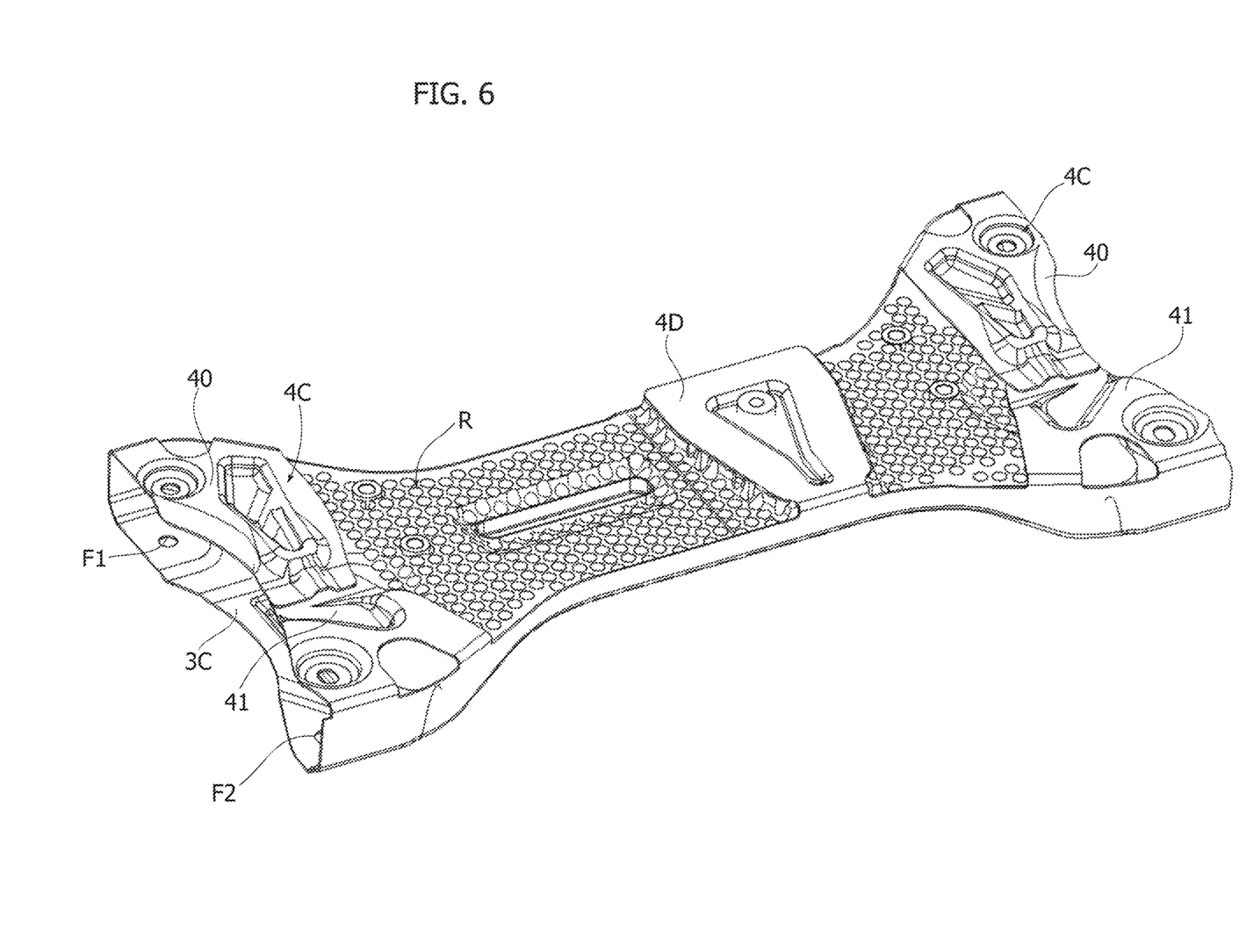
FIG. 6 is a perspective view in an inverted position of the preferred embodiment of the auxiliary cross-member structure according to the invention.

Again with reference to FIG. 7, at each end of the central portion 3, the metal blank S comprises a pair of connecting fins 40, 41 protruding from opposite sides of the central portion 3. The connecting fins 40, 41 are overlapped to each other in the folded final configuration of the metal sheet S and are mutually welded in order to define the lower wall portions 4C (FIG. 6).

The folding operation of the metal blank S is preferably performed around folding lines which are all parallel to the longitudinal direction of the cross-member.

The above described configuration of the hollow metal frame of the cross-member structure with an upper main wall 3 which is substantially continuous and including at the lower side only lower wall portions 4C, 4D, constitutes one of the possible solutions which have the advantage of a significant reduction of the weight of the structure. However, it is evident that any other configuration can be used, while always obtaining the main hollow metal frame of the cross-member structure starting from a single metal sheet. Therefore, it would be also possible to provide a starting blank configured so as to define a continuous main wall also on the lower face of the cross-member structure.

In the preferred embodiment herein described, the portion of intermediate lower wall 4D is defined by a connection fin 4D which protrudes from one side of the central portion 3 of the blank S. In the folded configuration, the free end of the fin 4D is overlapped and welded to the front edge 30 of the cross-member structure.

Figure 1:
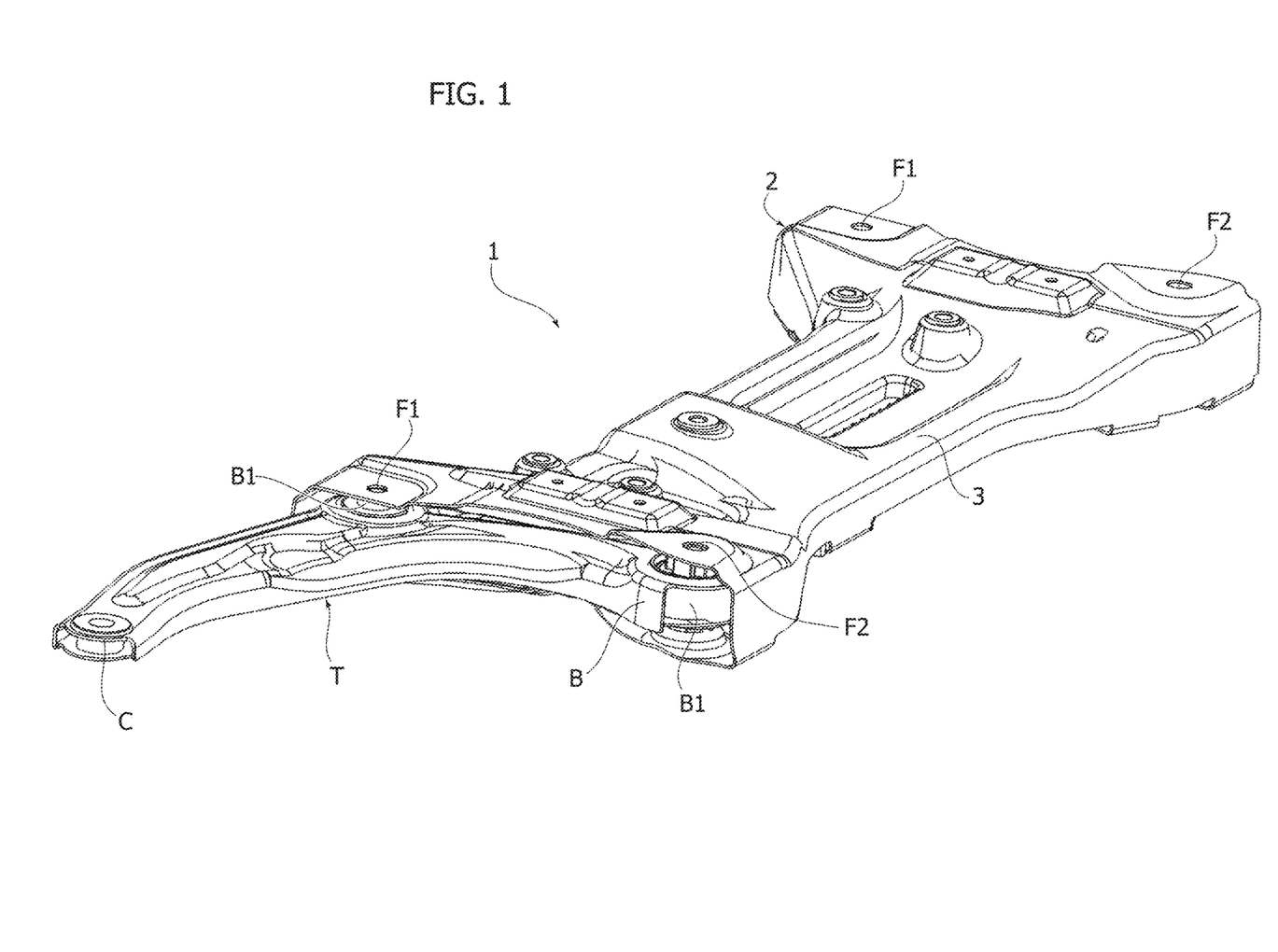
FIG. 1 is a perspective view of a preferred embodiment of the auxiliary cross-member structure according to the invention, with one of the two oscillating arms of the suspension illustrated in the mounted condition on the cross-member structure.
Figure 2:
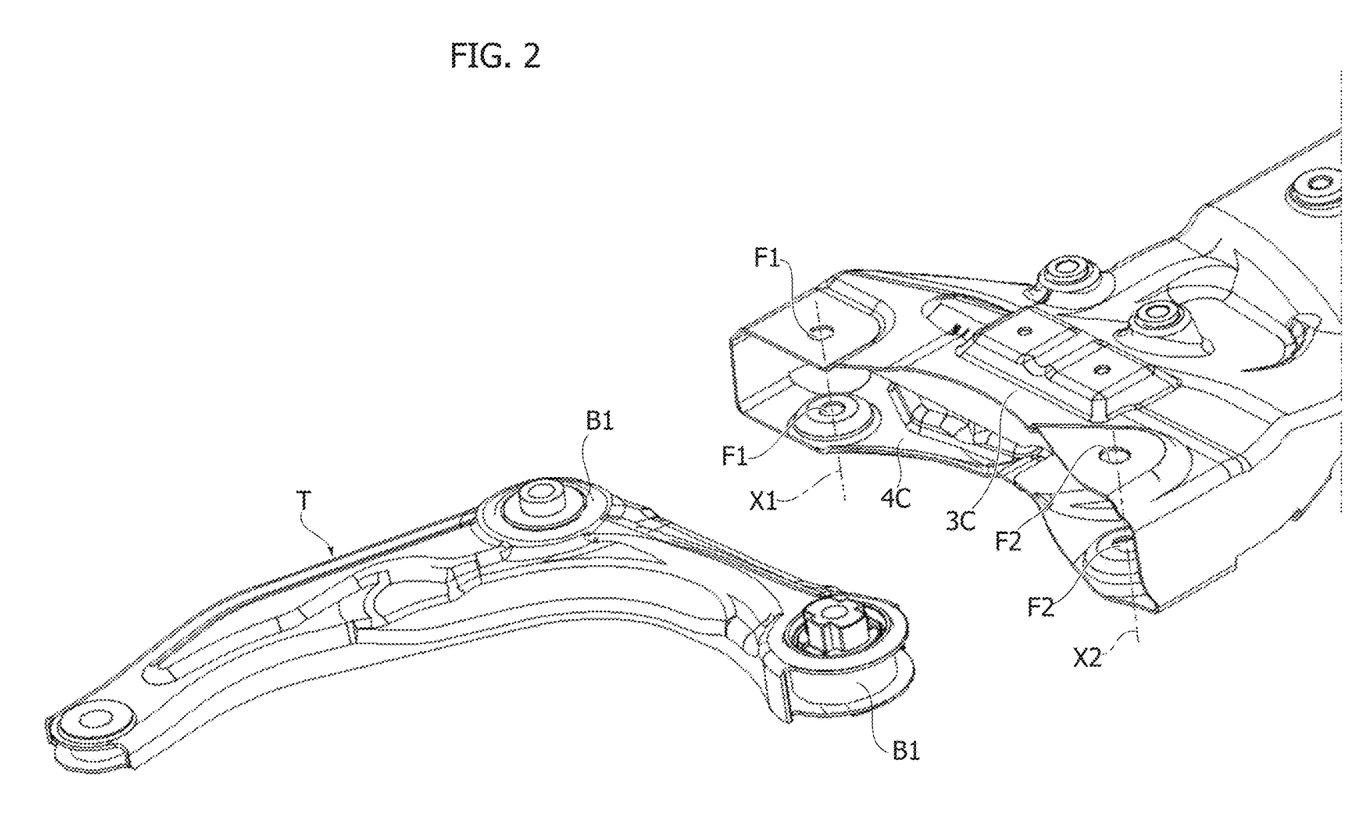
FIG. 2 shows an exploded view of a detail of one end of the cross-member structure of FIG. 1.
Figure 3:
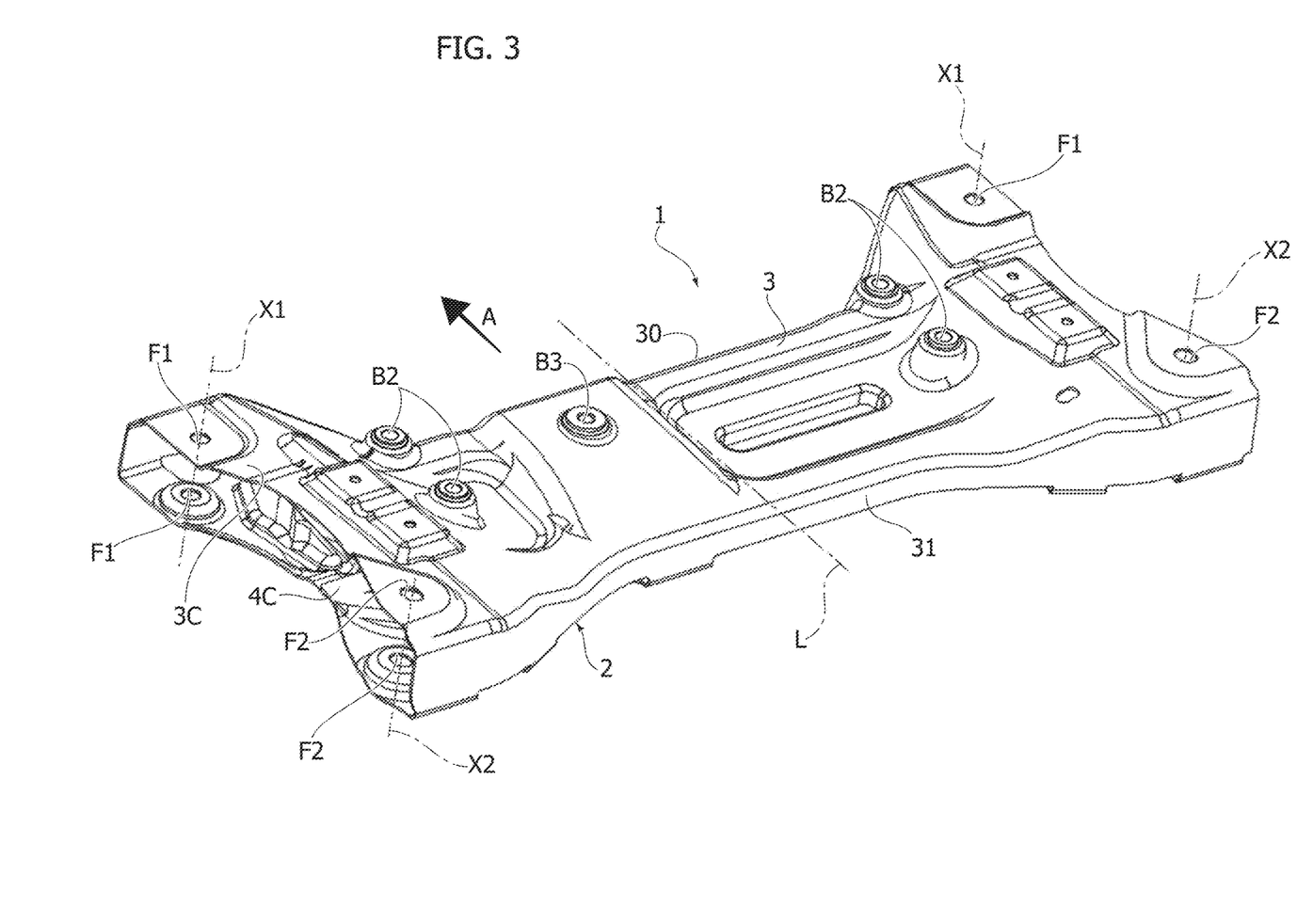
FIG. 3 is a further perspective view of the cross-member structure according to the invention, without the oscillating arms of the suspension.

Again with reference in particular to FIGS. 1-3 and 7, the two parallel and spaced walls 3C, 4C are provided at each end of the metal frame of the cross-member structure. The walls 3C, 4C have two pairs of holes F1, F2 aligned with each other along two vertical axes X1, X2 which are mutually spaced along the longitudinal direction. The holes F1, F2 are used both for mounting two elastic bushings B1 for connection of a respective oscillating arm T, and for engaging connecting members for connection of the auxiliary cross-member structure to the motor-vehicle body. FIGS. 1, 2 of the annexed drawings show one of the two oscillating arms T with an external end carrying a bushing C for the connection of the respective wheel (not illustrated) to the wheel support, said oscillating arm having branches on its internal side, these branches terminating with bushing portions B for mounting the elastic bushings B1. Therefore, in the case of the present invention, both elastic bushings B1 for connection of each oscillating arm T are oriented with their axes arranged vertically. Thanks to this feature, the pairs of holes F1, F2 can be used not only for mounting the elastic bushings B1, also for engaging connection screws of the cross-member structure 1 to the motor-vehicle body.

In the preferred embodiment of the invention, the four attachment points of the cross-members structure 1 to the motor-vehicle body, which are identified by two front axes X1 and two rear axes X2 located at opposite ends of the cross-member structure, constitute the only connection points of the auxiliary cross-member structure to the motor-vehicle body. Therefore, compared to the known solution illustrated in FIG. 10, the preferred embodiment of the cross-member structure according to the invention has only four points of connection to the motor-vehicle body, instead of six connection points. Furthermore, as previously indicated, the four points of connection to the motor-vehicle body are also used for mounting the elastic bushings B1 for connection of the oscillating arms of the suspension.

Therefore, as it may be seen, the cross-member structure according to the invention provides a significant simplification both with reference to the manufacture of the cross-member structure and with reference to the operations for assembling the auxiliary cross-member structure on the motor-vehicle body. Also, the weight of the cross-member structure is considerably reduced, due to the above described simplification and the elimination of the uprights 3B illustrated in FIG. 10.

Similarly to the known solution, the cross-member structure 1 according to the invention incorporates two pairs of bushings B2 with vertical axis, for engagement of connection screws which are used for mounting on the cross-member structure a control device for steering the motor-vehicle front wheels. Also, according to the known solution of FIG. 10, 11, the cross-member structure according to the invention has at an intermediate area (specifically in the area in which the intermediate portion of the lower wall 4D is provided), a bushing with vertical axis B3 which is used for engaging a connecting screw for mounting a bracket (not illustrated) intended to be connected to the powertrain structure of the motor-vehicle with a pivoted arm. As for the known solution of FIG. 10, 11, these details of construction are not herein illustrated since they are known and do not fall, taken alone, within the scope of the invention.

With the purpose of further reducing the weight of the auxiliary cross-member structure also through the use of a metal sheet with a lower thickness, while not affecting the required strength characteristics, the preferred embodiment of the invention provides an additional filling structure within the hollow metal body of the cross-member structure, which filling structure is preferably constituted at least partially of synthetic material, preferably a composite material including a synthetic resin incorporating reinforcement fibres (such as glass fibres, carbon fibres or aramid fibres). FIGS. 4-6 and 8 show by way of example an additional filling structure having a honeycomb configuration, with vertical axis cells.

Figure 9:
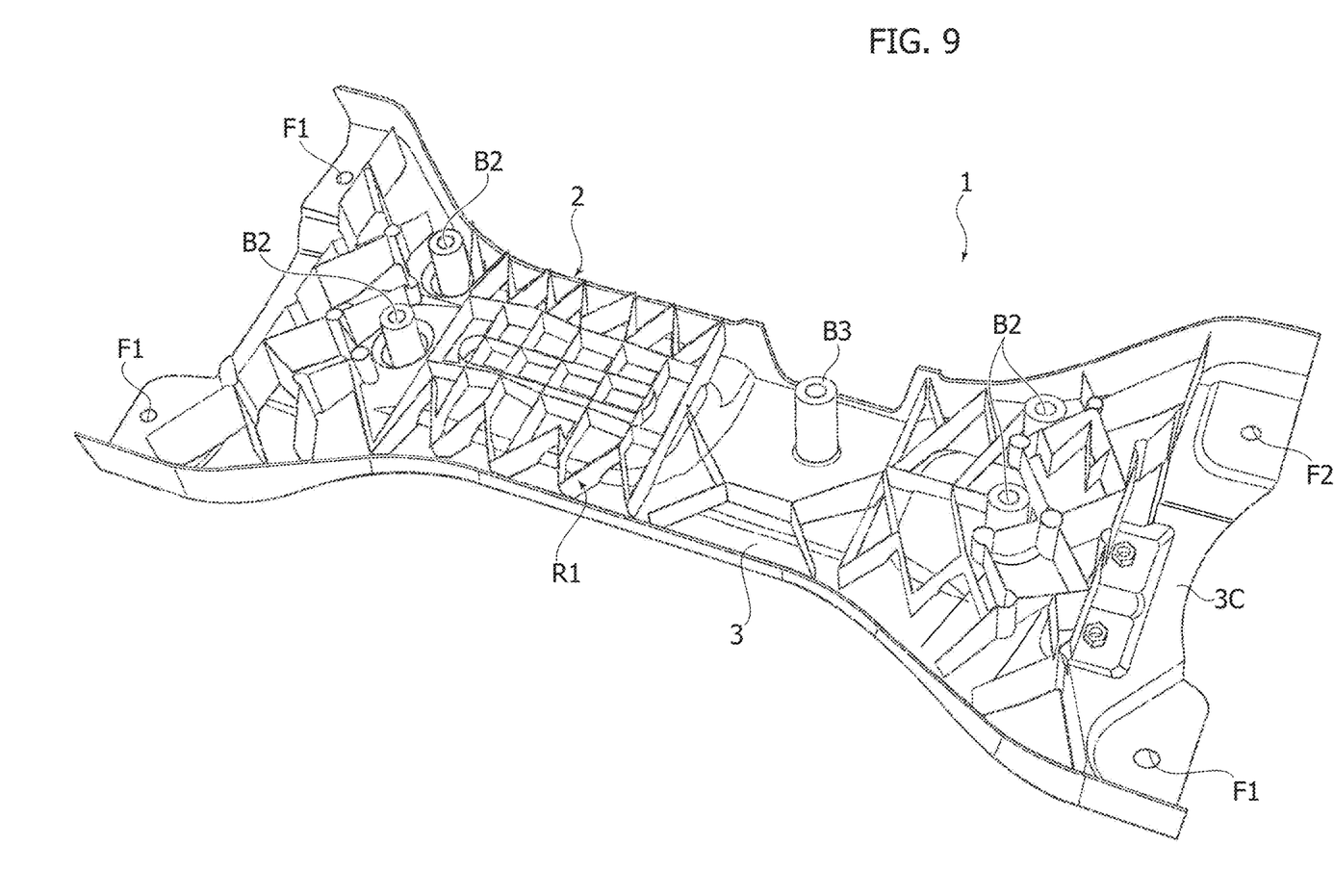
FIG. 9 is a perspective view in an inverted position of the cross-member structure in a second embodiment of the present invention.

The production and the configuration of the additional filling structure could be also different from the examples herein illustrated. For example, the configuration could be a sandwich configuration, including several panels of metal sheet and synthetic material, preferably composite material, stacked on each other. FIG. 9 shows an alternative embodiment in which the additional filling structure, indicated by R1, has a lattice configuration formed by intersecting vertical laminar elements.

Figure 4:
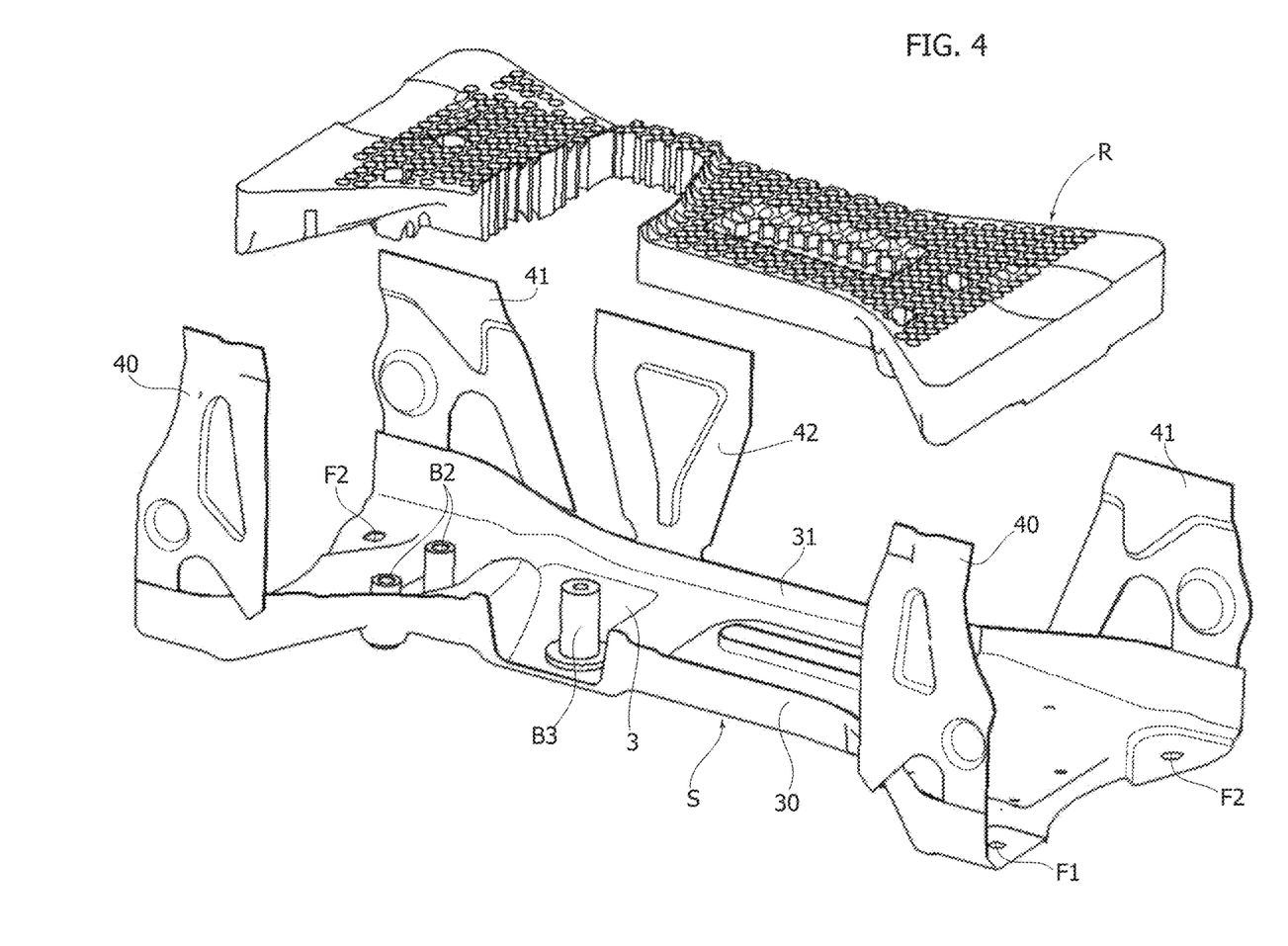
FIGS. 4, 5 are perspective views which show two consecutive steps of the manufacturing operations of the auxiliary cross-member structure according to the invention.
Figure 5:
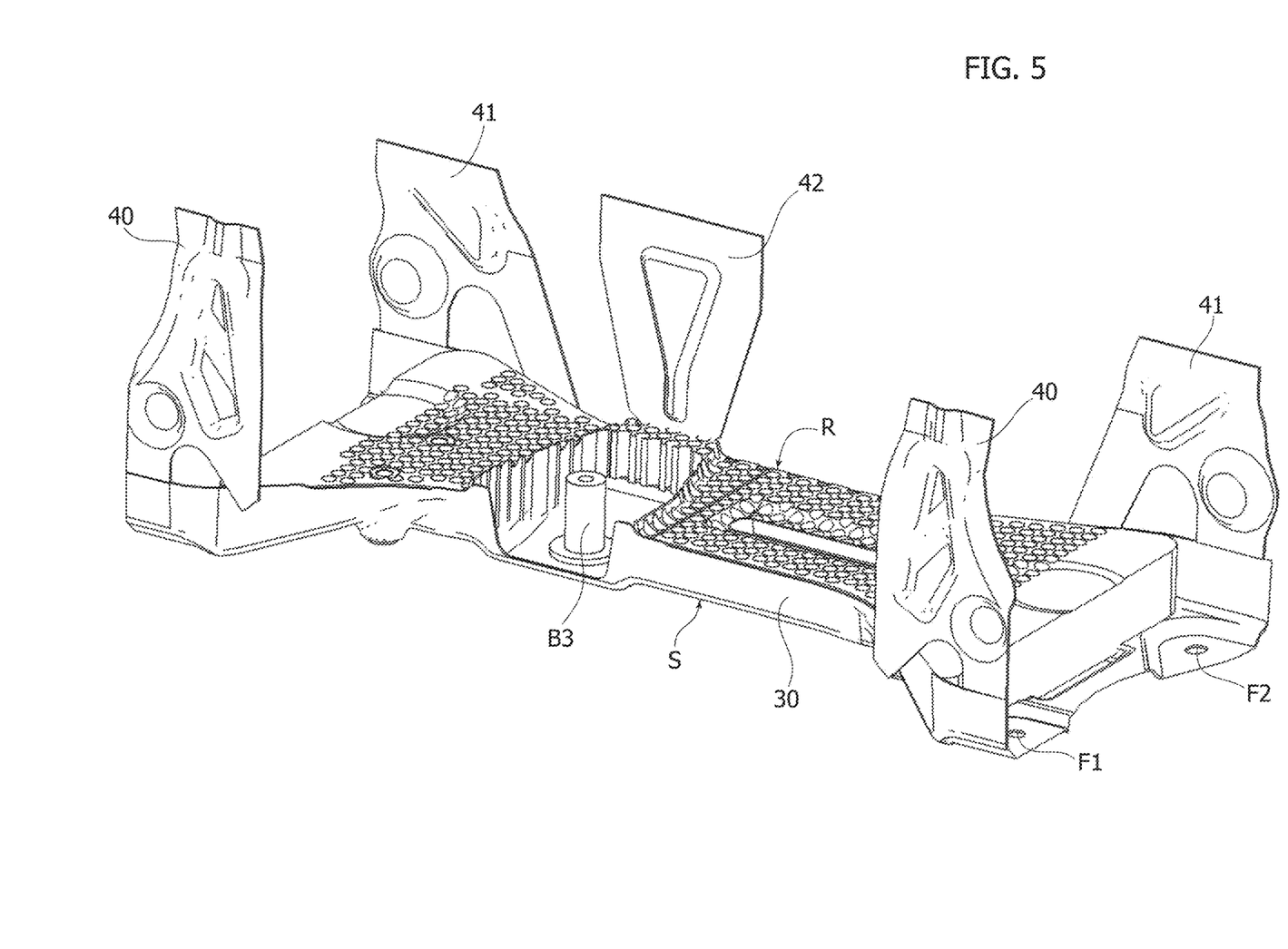

FIGS. 4, 5 show two subsequent steps of the production of the aforementioned preferred embodiment of the auxiliary cross-member structure according to the invention. The additional filling structure (generally designated by reference R) is arranged in contact with a lower face of the central main portion 3 of the blank S before folding the connecting fins 40, 41, 42 of the metal blank S. Even prior to this step, to said lower face of the central portion 3 of the metal blank S (see FIG. 4) the ends adjacent thereto of the vertical bushings B2, B3 are welded. The additional structure R can be for example secured by means of adhesives, rivets or thermal junctions, through holes and slots on the main portion 3 of the blank S.

As already above indicated, also the specific details relating to the configuration of the metal frame of the cross-member structure might vary with respect to what has been described and illustrated herein by way of example, while always providing at least the body constituting the main portion of the metal structure by starting from a single folded metal sheet.

Naturally, while the principle of the invention remains the same, the details of construction and the embodiments may widely vary with respect to what has been described and illustrated purely by way of example, without departing from the scope of the present invention.

What is claimed is:

1. An auxiliary cross-member structure for supporting elements of a motor-vehicle front suspension, said auxiliary cross member structure comprising:
   a metal sheet hollow frame in a form of a hollow shell, with two opposite end portions, for connection of two respective oscillating arms of the motor-vehicle front suspension,
   wherein said auxiliary cross-member structure is configured to be connected to a motor-vehicle body,
   wherein the metal sheet hollow frame of said auxiliary cross-member structure consists of a single metal sheet folded on itself, so as to have portions overlapped onto each other and mutually welded, and
   wherein each end portion of the two opposite end portions of said metal sheet hollow frame consists of an upper wall and a lower wall superimposed upon, and spaced from each other, and consisting of two pairs of connection areas aligned with each other along two vertical axes adapted to be mutually spaced along a longitudinal direction of the motor-vehicle, when said auxiliary cross-member structure is in a mounted condition on the motor-vehicle body, said pairs of connection areas being adapted to be used both for mounting two elastic bushings for connection of a respective oscillating arm of the motor-vehicle front suspension, and adapted for engagement of connecting members for connecting the auxiliary cross-member structure to the motor-vehicle body.

2. The auxiliary cross-member structure according to claim 1, further comprising a filling structure contained within the metal sheet hollow frame and rigidly connected thereto.

3. The auxiliary cross-member structure according to claim 2, wherein said filling structure is at least partially constituted of synthetic material or composite material incorporating reinforcing fibers.

4. The auxiliary cross-member structure according to claim 3, wherein said additional filling structure has a honeycomb configuration, with cells having vertical axes.

5. The auxiliary cross-member structure according to claim 3, wherein said filling structure has a lattice configuration.

6. The auxiliary cross-member structure according to claim 3, wherein said filling structure has a sandwich configuration with a plurality of panels of sheet metal and synthetic or composite material which are stacked on each other.

7. The auxiliary cross-member structure according to claim 1, wherein said two pairs of connection areas having said two vertical axes located at each end portion of the auxiliary cross-member structure constitute the only connection points of the auxiliary cross-member structure to the motor-vehicle body.

8. The auxiliary cross-member structure according to claim 1, wherein the single metal sheet is configured to be folded around folding lines which are all parallel to a folding axis that is parallel to a longitudinal direction of the cross-member, to form the metal sheet hollow frame.

9. An auxiliary cross-member structure for supporting elements of a motor-vehicle front suspension, said auxiliary cross member structure comprising:
   a metal sheet hollow frame in a form of a hollow shell, with two opposite end portions, for connection of two respective oscillating arms of the motor-vehicle front suspension,
   wherein said auxiliary cross-member structure is configured to be connected to a motor-vehicle body,
   wherein the metal sheet hollow frame of said auxiliary cross-member structure consists of a single metal sheet folded on itself, so as to have portions overlapped onto each other and mutually welded, and
   wherein said metal sheet hollow frame consists of a substantially flattened configuration, consisting of an upper main wall, a front edge, a rear edge, at least two lower wall portions arranged parallel to and spaced from the upper main wall at the two opposite ends of the cross-member structure, and a lower wall portion located in an intermediate position between the two opposite ends of the cross-member structure and also arranged parallel to, and spaced from the upper main wall.

10. The auxiliary cross-member structure according to claim 9, wherein said single metal sheet comprises an elongated central portion which forms said upper main wall of the metal sheet hollow frame and which includes two lateral opposite webs which form said front and rear edges of the metal sheet hollow frame, said single metal sheet including also two connecting fins protruding from opposite sides of each end of said elongated central portion, which are folded and welded to each other in overlapped positions, for forming a respective lower wall portion of said metal sheet hollow frame, said single metal sheet comprising also a further connecting fin protruding from an intermediate area of the elongated central portion of the single metal sheet and forming said intermediate lower wall portion of the metal sheet hollow frame.

\* \* \* \* \*